(12) United States Patent
Rogers et al.

(10) Patent No.: US 12,248,472 B2
(45) Date of Patent: *Mar. 11, 2025

(54) SYSTEMS AND METHODS FOR DYNAMIC QUERY PREDICTION AND OPTIMIZATION

(71) Applicant: The Travelers Indemnity Company, Hartford, CT (US)

(72) Inventors: Denise Rogers, West Hartford, CT (US); Yulanda Henry, Hartford, CT (US); David P. Therrien, Wallingford, CT (US); Rebecca Peralta, West Hartford, CT (US); Adam J. Rychlik, Bristol, CT (US); Bibek Mishra, Manchester, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,490

(22) Filed: Jan. 27, 2023

(65) Prior Publication Data
US 2023/0169078 A1 Jun. 1, 2023

Related U.S. Application Data

(63) Continuation of application No. 16/588,356, filed on Sep. 30, 2019, now Pat. No. 11,593,370.

(51) Int. Cl.
*G06F 16/00* (2019.01)
*G06F 16/215* (2019.01)
*G06F 16/242* (2019.01)
*G06F 16/2453* (2019.01)
*G06N 5/04* (2023.01)
*G06N 20/00* (2019.01)

(52) U.S. Cl.
CPC ...... *G06F 16/24542* (2019.01); *G06F 16/215* (2019.01); *G06F 16/2425* (2019.01); *G06N 5/04* (2013.01); *G06N 20/00* (2019.01)

(58) Field of Classification Search
None
See application file for complete search history.

(56) References Cited

U.S. PATENT DOCUMENTS

| 10,162,729 B1 | 12/2018 | Snyder et al. |
| 10,540,256 B1 | 1/2020 | Snyder et al. |

(Continued)

FOREIGN PATENT DOCUMENTS

| AU | 2006229761 A1 | * 11/2007 | ........... G06F 16/242 |
| AU | 2006332534 B2 | * 2/2011 | ....... G06Q 10/06393 |
| CA | 2603673 A1 | * 10/2006 | ............. G06F 17/30 |

OTHER PUBLICATIONS

Donges, Niklas. Webpage: Builtin.com. "Random Forest Algorithms: A Complete Guide" (updated Sep. 16, 2021). downloaded Mar. 14, 2022. https://builtin.com/data-science/random-forest-algorithm. 14 pgs.

(Continued)

*Primary Examiner* — Bai D Vu
(74) *Attorney, Agent, or Firm* — RowanTree Law Group, PLLC; Carson C. K. Fincham (57) ABSTRACT

Systems, apparatus, methods, and articles of manufacture provide for evaluation of and prediction for data queries (e.g., SQL statements). In one example implementation, a controller device trains a data model for classifying input SQL queries. The controller classifies each input SQL query by testing it against the data model, without requiring actual execution of the SQL query.

26 Claims, 7 Drawing Sheets

(56) References Cited

U.S. PATENT DOCUMENTS

| | | |
|---|---|---|
| 10,585,663 B1 | 3/2020 | Anderson et al. |
| 10,678,785 B1 | 6/2020 | Anderson et al. |
| 11,099,968 B1 | 8/2021 | Snyder et al. |
| 11,106,665 B1 | 8/2021 | Anderson et al. |
| 11,169,997 B1 | 11/2021 | Debo et al. |
| 2013/0246383 A1 | 9/2013 | White et al. |
| 2016/0092781 A1 | 3/2016 | Byrnes et al. |
| 2017/0308579 A1 | 10/2017 | Wright et al. |
| 2020/0159848 A1 | 5/2020 | Yeo |

OTHER PUBLICATIONS

Webpage: javatpoint.com. "Machine Learning Random Forest Algorithm". downloaded Mar. 14, 2022. h. https://www.javatpoint.com/machine-learning-random-forest-algorithm. 12 pgs.

Koehrsen, Will. Webpage: Towards Data Science (TDS). "Random Forest in Python" (Dec. 27, 2017). downloaded Jul. 12, 2022. https://towardsdatascience.com/random-forest-in-python-24d0893d51c0. 47 pgs.

M.K, Gurucharan. Webpage: Towards Data Science (TDS). "Machine Learning Basics: Random Forest Classification" (Sep. 22, 2020). downloaded Jul. 12, 2022. https://towardsdatascience.com/machine-learning-basics-random-forest-classification-499279bac51e. 17 pgs.

Office Action for U.S. Appl. No. 16/588,356 dated Aug. 27, 2021; 7 pps.

Final Office Action for U.S. Appl. No. 16/588,356 dated Dec 15, 2021; 7 pps.

Office Action for U.S. Appl. No. 16/588,356 dated Apr. 27 2022; 10 pps.

Final Office Action for U.S. Appl. No. 16/588,356 dated Aug. 18, 2022; 9 pps.

Notice of Allowance for U.S. Appl. No. 16/588,356 dated Nov. 17, 2022; 9 pps.

\* cited by examiner

SYSTEMS AND METHODS FOR DYNAMIC QUERY PREDICTION AND OPTIMIZATION

CROSS-REFERENCE TO RELATED APPLICATIONS

Benefit and priority under 35 U.S.C. § 120 is hereby claimed to, and this is a Continuation of, U.S. patent application Ser. No. 16/588,356 filed on Sep. 30, 2019 and titled "SYSTEMS AND METHODS FOR DYNAMIC QUERY PREDICTION AND OPTIMIZATION", which issued as U.S. Pat. No. 11,593,370 on Feb. 28, 2023, which is hereby incorporated by reference herein in its entirety.

FIELD OF THE INVENTION

The present invention relates generally to systems for information retrieval, and more particularly to improvements in computerized systems for query performance prediction and optimization.

BACKGROUND OF THE INVENTION

Prior art systems are known for evaluating and predicting performance efficiency of structured query language (SQL) queries in enterprise environments. Typically, performance efficiency is evaluated on the basis of execution time (how long it takes to run the SQL query against a particular database and return the selected records) and/or resource cost parameters, such as a number of machine or CPU cycles required to execute the SQL query, or the number of physical block reads required for the execution of the SQL query. Such prior art systems, however, typically require executing the SQL query to be evaluated against the actual production database and/or against a copy of or an emulated database environment. Accordingly, the prior art efficiency evaluation systems themselves are inefficient in terms of the time taken to test and/or in terms of the utilization of resources that must be expended to evaluate the queries. Prior art systems may be further limited to the availability of human participants designated to manually evaluate and make recommendations for tuning underperforming or inefficient queries. Thus, the prior art systems are not optimized for the evaluation and optimization of SQL queries. The technical drawbacks of these prior art systems lead to slower development cycles and inefficient use of computing resources.

SUMMARY OF THE INVENTION

According to some embodiments of the present invention, systems, methods, apparatus, articles of manufacture, and/or computer readable media (e.g., a non-transitory computer readable memory storing instructions for directing a processor of a device for developing and/or executing database queries) provide a process for predicting and/or optimizing performance of database queries. In some embodiments, a process for predicting and/or optimizing performance of database queries comprises the following steps:
a) determining a model for query prediction based on prior queries;
b) classifying a query based on the model and at least one feature of the query; and/or
c) outputting a prediction for the query performance based on the query classification.

According to some embodiments, systems, methods, apparatus, articles of manufacture, and/or computer readable media may provide for one or more of:
a) accessing historical query data;
b) generating classification data (e.g., feature data, table size data, and/or join indicator data) for each query of the historical query data; and/or
c) generating a query classification model for query optimization based on the classification data and at least one machine learning technique.

According to some embodiments of the present invention, systems, methods, apparatus, articles of manufacture, and/or computer readable media provide a process for automated prediction and/or recommendations for an SQL query without executing the SQL query (e.g., against a database).

According to some embodiments of the present invention, systems, methods, apparatus, articles of manufacture, and/or computer readable media provide a process for predicting and/or optimizing performance of database queries. In some embodiments, a process for predicting and/or optimizing performance of database queries comprises the following steps:
a) training a model for query classification (e.g., using a random forest classifier and/or other type of classification method) and historical query data;
b) comparing a query for tuning to the model;
c) generating a prediction result for the query;
d) selecting recommendation data based on the query and the prediction result;
e) outputting the prediction result; and/or
f) outputting the recommendation data.

According to some embodiments of the present invention, systems, methods, apparatus, articles of manufacture, and/or computer readable media provide a process for predicting and/or optimizing performance of database queries. In some embodiments, a process for predicting and/or optimizing performance of database queries comprises the following steps:
a) receiving an SQL statement for tuning;
b) transforming the SQL statement to generate a cleaned SQL statement;
c) generating at least one query feature string;
d) generating a dataset of feature count vectors for the at least one query feature string;
e) assembling an aggregate feature vector based on the dataset of feature count vectors;
f) accessing a dataset of historical aggregate feature vectors;
g) testing the aggregate feature vector against the dataset of historical aggregate feature vectors;
h) generating an SQL statement performance prediction; and/or
i) outputting the SQL statement performance prediction.

According to some embodiments, systems, methods, apparatus, articles of manufacture, and/or computer readable media may provide for one or more of:
a) receiving an input query to evaluate;
b) accessing a query classification model;
c) applying the querying classification model to the input query to predict query performance; and/or
d) updating a historical query dataset with the input query data.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

According to some embodiments of the present invention, systems, methods, and apparatus for evaluating and/or optimizing database queries address technical problems associated with identifying potential performance issues by executing queries and/or by requiring human evaluation of SQL statements. The inventors have recognized that there is a need for query evaluation and query forecasting processes that expedite query tuning and software development and optimize use of system resources by evaluating the optimization of queries without requiring execution of queries in production environments.

In accordance with some embodiments, methods and systems are provided a data model training function that can take advantage of a large set of data representative of historical data queries and associated performance and/or cost data in a computer-based learning platform (e.g., based on machine learning and/or other artificial intelligence techniques) to generate predictive information and/or recommendation information for newly-submitted data queries (e.g., SQL queries). In one or more embodiments, a technical advantage is achieved by generating feature-based vectors for each new data query based upon specific features of the data query, and then identifying historical data queries that have similar feature-based vectors in order to predict a performance of the submitted data query and/or to identify recommendation information for modifying the submitted data query.

In accordance with one or more embodiments described in this disclosure, a machine learning process generates a query classification model based on one or more of: phrases from past SQL queries (e.g., SELECT, WHERE, GROUP, JOIN, RANK, etc.), table size indicators (e.g., based on a number of rows in a table identified in the SQL query), and at least one join indicator (e.g., a left join indicator). According to some embodiments, a model building process comprises a machine learning pipeline used to drive assembled vectors for modeling, the pipeline combining various functions, including, without limitation, a tokenizer, a stop word remover, a count vectorizer, and/or a vector assembler. In some embodiments, the model building process comprises a classifier based on the random forest classification technique, which typically provides relatively fast prediction response and improved qualification of the ensemble model. Alternatively, or in addition, the classifier may be based on one or more other types of machine learning algorithms, such as, without limitation, those employing logistic regression, neural networks, naïve Bayes, support vector machines, boosted trees, and/or gradient boosting algorithms (GBM)). Although some examples may be described in this disclosure with respect to random forest classification techniques, it will be readily understood that any number or type of classification techniques may be used as desired for a particular implementation. In one or more embodiments, a trained model may be employed for predicting queries received by a query evaluation system (e.g., submitted by a user through a web-based user interface).

As will be understood by those of skill in the art, a data query (e.g., an SQL statement) may include any number of operations to retrieve, store, modify, and/or delete certain data stored in one or more data storage systems. A data query may, in some implementations, also include any number of operations to process any retrieved data. A data query may be expressed in a query language, such as SQL and/or expressed using other programming languages or other models.

According to some embodiments, certain query features and query optimization classifications for a plurality of historical data queries may be correlated to generate a query classification model that enables the execution optimization of a particular query to be predicted based on various features of the data query (e.g., based on certain SQL phrases, table size indicators, join indicators, and the like). For example, the optimization may be expressed in one or more various ways, such as, without limitation, a binary "optimal"/"not optimal" identification, and/or as a selection from a plurality of relative optimization rankings (e.g., "high," "medium," "low"). In some implementations, the correlation of the query features and the query optimization classification may employ a machine learning-based analysis that is a process for modeling a relationship between determined optimization status (e.g., as an independent variable) and the query features data (e.g., as dependent variables).

According to some alternative embodiments, certain query features and query cost data for a plurality of historical data queries may be correlated to generate a query classification model that enables the execution performance (e.g., time it takes a query to execute) of a particular query to be predicted based on various features of the data query. In some implementations, the correlation of the query features and the query cost data may employ a machine learning-based analysis that is a process for modeling a relationship between the query cost data (e.g., as an independent variable) and the query features data (e.g., as dependent variables).

In accordance with one or more embodiments described in this disclosure, some or all steps of a software development life cycle may be improved, and technical weaknesses overcome, using specific configurations of features and/or hardware to provide for automatic evaluation of data query optimization and/or automatic recommendation of adjustments to submitted data queries.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used herein, the term "user" may generally refer to any type, quantity, and/or manner of individual that uses a system for evaluating and/or optimizing data queries, as described with respect to various embodiments in this disclosure.

Some embodiments described herein are associated with a "user device" or a "network device." As used herein, a user device is a subset of a network device. The network device, for example, may generally refer to any device that can communicate via a network, while the user device may comprise a network device that is owned or operated by or otherwise associated with any type of user (e.g., a developer of a software application, a user of a data query optimization application). Examples of user and/or network devices may include but are not limited to: a personal computer (PC), a computer workstation, a computer server, a smartphone, a tablet computer, or a wireless or cellular telephone. User, customer and/or network devices may comprise one or more network components.

As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium, such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

As used herein, "determining" includes calculating, computing, deriving, looking up (e.g., in a table, database, or data structure), ascertaining, and/or recognizing.

As used herein, "processor" means any one or more microprocessors, Central Processing Unit (CPU) devices, computing devices, microcontrollers, and/or digital signal processors. As used herein, the term "computerized processor" generally refers to any type or configuration of primarily non-organic processing device that is or becomes known. Such devices may include, but are not limited to, computers, Integrated Circuit (IC) devices, CPU devices, logic boards and/or chips, Printed Circuit Board (PCB) devices, electrical or optical circuits, switches, electronics, optics and/or electrical traces. As used herein, "mechanical processors" means a sub-class of computerized processors, which may generally include, but are not limited to, mechanical gates, mechanical switches, cogs, wheels, gears, flywheels, cams, mechanical timing devices, etc.

Figure 1:
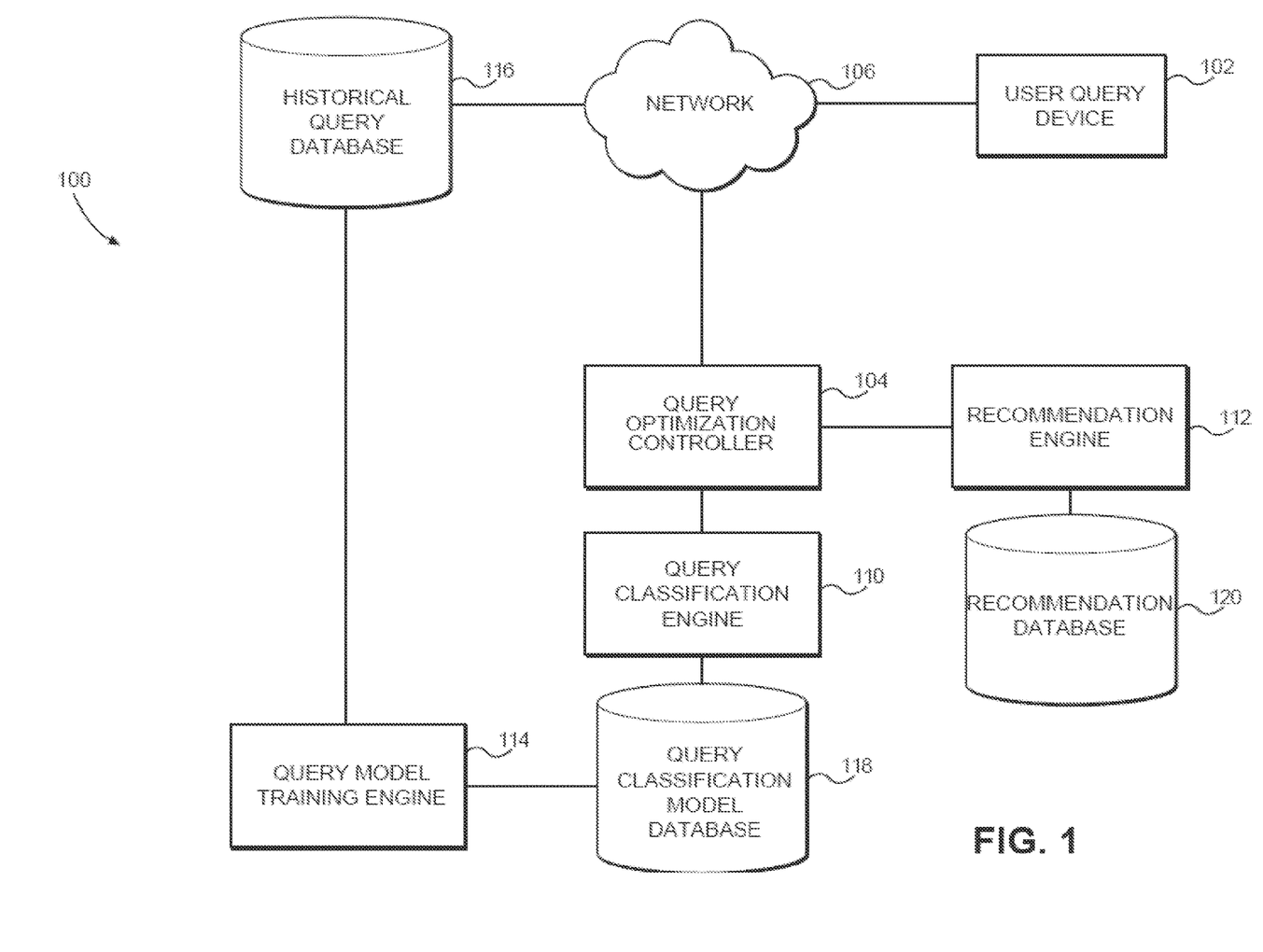
FIG. 1 is a block diagram of a system according to one or more embodiments.

Turning first to FIG. 1, a block diagram of a query optimization system 100 according to some embodiments is shown. The query optimization system 100, in one embodiment, may comprise one or more user query devices 102 in communication via a network 106 with an historical query database 116 and a query optimization controller 104.

As depicted in FIG. 1, the example query optimization controller 104 is in communication with query classification engine 110 and a recommendation engine 112.

The query classification engine 110 is in communication with a query classification model database 118 containing one or more query classification models for use by the query classification engine 110 (e.g., at the direction of the query optimization controller 104) to evaluate the optimization of a given data query (e.g., an SQL query received from one of the user query devices 102). According to some embodiments, the query classification model database 118 is in communication with query model training engine 114, which is in communication with historical query database 116. In one or more embodiments, the query model training engine 114 is configured to use information about existing queries from historical query database 116 to train one or more query classification models (e.g., using one or more machine learning classifiers). The information stored in historical query database 116 may be received from one or more data sources, including user query device 102.

The recommendation engine 112 is further in communication with a recommendation database 120 storing information about changes and/or alternative query statement language that may be suitable for improving a data query submitted to query optimization controller 104 for evaluation. In one example, if a data query is determined to be not optimal, or predicted to be relatively expensive or inefficient, recommendation engine 112 may retrieve from recommendation database 120 at least one suggested change based on the prediction of query classification engine 110.

In some embodiments, one or more components of the system 100 may be hosted by a controller or server computer (e.g., a computer specially programmed to provide for one or more of the functions described in this disclosure). Typically, a processor (e.g., one or more microprocessors, one or more microcontrollers, one or more digital signal processors) of a client computer or a server computer will receive instructions (e.g., from a memory device or like device), and execute those instructions, thereby performing one or more processes defined by those instructions. Instructions may be embodied in, for example, one or more computer programs and/or one or more scripts.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers and/or server computers will be readily understood by one skilled in the art upon contemplation of the present disclosure.

Figure 2:
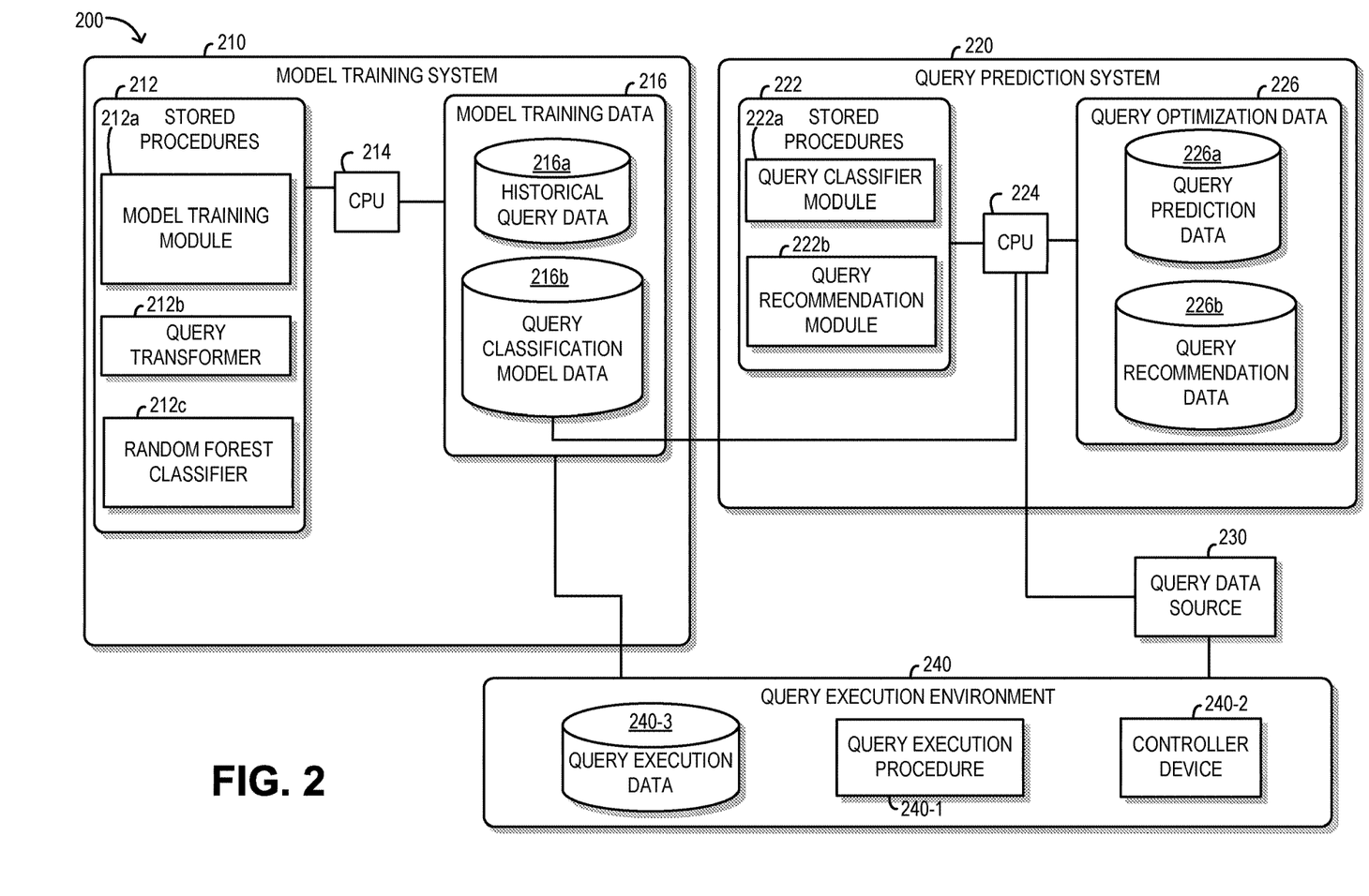
FIG. 2 is a block diagram of a system according to one or more embodiments.

Referring now to FIG. 2, a block diagram of a system 200 according to some embodiments is shown. In some embodiments, the system 200 may comprise a model training system 210, a query prediction system 220, a query data source 230, and/or a query execution environment 240. In some embodiments, the model training system 210 may comprise a plurality of stored procedures 212, CPU 214, and data storage 216. The query prediction system 220 may comprise a plurality of stored procedures 222, CPU 224, and query optimization data 226.

Any component depicted in the system 200 may comprise a single device, a combination of devices, and/or a plurality of devices, as is or becomes desirable and/or practicable. Similarly, in some embodiments, one or more of the various components may not be needed and/or desired in the system 200.

According to some embodiments, the query data source 230 (e.g., a user query device 102) may be coupled to, configured to, oriented to, and/or otherwise disposed to provide and/or communicate data to CPU 224 and to query execution environment 240. Query data source 230 may, for example, provide one or more SQL data queries that may be processed by query prediction system 220 in accordance with query classifier module 222a and/or query recommendation module 222b. Similarly, query data source 230 may provide an SQL data query (e.g., one identified as optimal by query prediction system 220) to query execution environment 240 for execution by controller device 240-2 using query execution procedure 240-1.

In some embodiments, information related to the execution of the data query (e.g., a copy of the data query, information about performance of the data query, information about resource cost of the executed data query, information about data retrieved using the query) may be stored as query execution data 240-3 and/or transmitted to database 216 of the model training system 210. According to some embodiments, query execution data 240-3, which may include information about a plurality of historical data queries, may be used by the model training system 210 to train a query classification model using model training module 212a, query transformer 212b, and/or random forest classifier 212c of the stored procedures 212.

In some embodiments, the data stored in any or all of the databases 216 may be utilized by the model training system 210. The model training system 210 may, for example, execute and/or initiate one or more of the stored procedures 212 to process the data in the databases 216 (or one or more portions thereof) and/or to define one or more tables or other types of data stores (e.g., for use in generating a query classification model and/or for use in evaluating a data query submitted to the query prediction system 220). In some embodiments, the stored procedures 212 may comprise one or more of model training module 212a, query transformer 212b, and/or random forest classifier 212c.

According to some embodiments, the execution of the stored procedures 212a-c may define, identify, calculate, create, reference, access, update and/or determine one or more data tables or other data stores. In some embodiments, one or more of the databases 216 and/or associated data tables, historical query data 216a and query classification model data 216b, determined via one or more of stored procedures 212a-c, may store information about one or more query classification models. Accordingly, any references to databases 216 in describing various embodiments in this disclosure may be understood as applying to, alternatively or in addition, one or more of data stores 216a and 216b.

According to some embodiments, model training module 212a may be configured to control and/or execute one or more of query transformer 212b, and/or random forest classifier 212c, and/or may be configured to determine and/or store query classification model data 216b defining one or more customized query classification models.

In one or more embodiments, model training module 212a comprises a machine learning module applying one or more machine learning techniques (e.g., random forest classifier 212c) to historical data queries and associated metadata stored in historical query data 216a to develop query classification models for use in predicting query performance and/or optimization.

In some embodiments, query transformer 212b (e.g., under the control of model training module 212a) operates to parse, translate, and/or otherwise process the historical queries to assist in cleaning up and transforming each query for use in training a query classification model. In one example, the query transformer 212b includes instructions for one or more of: extracting all words from data queries; converting dates in queries to standardized text string formats (e.g., YYYYxMMxDD); removing comment text; removing tabs and new line characters; removing one or more types of stop words (e.g., "and", "or", "null". "as", "on", "is", "by", "case", "when", "then", "else", "end", "sum", "< >", "<=", ">=", "<", ">", "=", "left", "right"); establishing a count vector for each feature vector; and creating assembled vectors by concatenating count vectors for each query feature. In one example, each data query processed by the query transformer 212b results in an output text string that is a transformation of the original data query into a single-line query.

In some embodiments query transformer 212b may further provide for segmenting each analyzed historical data query into one or more component query features (e.g., SELECT, FROM, JOIN, WHERE, GROUP BY, RANK). In one example, within each query feature, all elements of each query feature may be sorted, if desired, and combined into a string with a predefined delimiter. Alternatively, elements may be associated with the respective query feature using any one or more of various data storage techniques known to those skilled in the art. Accordingly, each historical query being analyzed for training the query classification model may be associated with one or more respective query feature defining the query, each query feature being associated with one or more respective elements defining the feature.

According to some embodiments, the query transformer 212b may further formulate count vectors and assembled vectors for all identified query features of a data query. As used in this disclosure, a count vector is a representation of text that lists each word of a data query and its corresponding frequency. The words may be represented, in accordance with some embodiments, as an index. An assembled vector, for the purposes of this disclosure, is a concatenation of count vectors with a continuous index. Examples of query transformation, including creating count vectors and assembled vectors, are described below.

According to an example model training process using a random forest classifier, an historical SQL query is retrieved from historical query data 216a by CPU 214 in accordance with instructions of query model training module 212a. According to this illustrative example, the historical SQL query is:

SELECT TB1.COLUMN_A, TB1.COLUMN_B, TB1.COLUMN_C, SUM(TB2.COLUMN_D)
FROM TABLE_1
JOIN TABLE_2 ON (TB1.COLUMN_C=TB2.COLUMN_D)
WHERE COLUMN_C='AAA'
GROUP BY COLUMN_A, COLUMN_B, COLUMN_C
QUALIFY RANK( ) OVER (PARTITION BY COLUMN_A ORDER BY COLUMB_B)=1.

According to some embodiments, model training module 212*a* calls query transformer 212*b* to clean up the historical SQL query by identifying words (e.g., using a regex tokenizer function), extracting all words from identified features, and removing certain identified stop words (e.g., "and", "="). The query transformer 212*b* effectively transforms the historical SQL query by identifying certain features and creating an element-by-element description of those features in a standardized format (e.g., in text strings with predetermined delimiters; in a comma separated value spreadsheet file; in a data table of rows and columns).

In one simplified example (focusing on only the FROM and JOIN features), the example historical SQL query above is cleaned and formatted to provide the following query feature descriptions of the elements of the FROM and JOIN features:

ftr_from: [TABLE_1]
ftr_join: [=~ON-COLUMN_C-COLUMN_D-TABLE_2~TB1~TB2].

After the SQL feature words are extracted, the query feature descriptions are transformed to:

ftr_from: [table 1]
ftr_join: [=,ON,COLUMN_C,COLUMN_D,TABLE_2, TB1,TB2].

Then, stop words (e.g., "=", "ON") are removed to provide the final feature query descriptions:

ftr_from: [table 1]
ftr_join: [COLUMN_C,COLUMN_D,TABLE_2,TB1, TB2].

It will be understood that any one or more features and/or combinations of features of a given type of data query (in addition to or in lieu of the example JOIN and/or FROM features) may be used for model training, as deemed desirable for a particular implementation.

Following this example transformation of the historical SQL query, the query feature descriptions are then further transformed by instructions of query transformer 212*b* to extract corresponding count vectors and an assembled vector. Additional historical SQL queries may be similarly transformed as described above. Ultimately, training dataset count vectors (for all previous training queries) and assembled vectors for the training dataset to date (e.g., based on a plurality of historical SQL queries) may be determined, such as:

ftr_from: [0:TABLE_1, 1:TABLE_, 2:TABLE_3, 3: TABLE_A]
ftr_join: [0:COLUMN_A, 1:TABLE_2, 2:TABLE_3]
features: [0:TABLE_1, 1:TABLE_, 2: TABLE_3, 3:TABLE_A, 4:COLUMN_A, 5:TABLE_2, 6:TABLE_3], where the "features" description describes the concatenation of count vectors with a continuous index.

The feature count vectors for the particular historical SQL query being used to train the model may be determined, according to the example, to be:

ftr_fromclassvec: {"type":0,"size":4,"indices":[0],"values":[1.0]}
ftr_joinclassvec: {"type":0,"size":3,"indices":[1],"values":[1.0]}, These count vectors for each feature may then be concatenated to create an assembled vector for the input SQL query:

"features":{"type":0,"size":7,"indices":[0,5],"values": [1.0,1.0]}}.

Finally, the features are input to a random forest classifier 212*c* or other machine learning function to further train the query classification model, which may be updated and/or stored in query classification model data 216*b* in association with an indication of performance and/or cost data associated with the data query (e.g., based on its execution in a production environment). Once a suitable machine learning model is identified for the data query prediction application, it typically needs to be "tuned" (trained and updated from time to time) with different parameter values until it achieves a desired level of predictive accuracy.

According to some embodiments, query classification model data 216*b* may be used by the query prediction system 220 to evaluate and make a prediction and/or recommendation for a submitted data query (e.g., received from query data source 230). In one or more embodiments, query classifier module 222*a* of the stored procedures 222 identifies a corresponding classifier of the trained query classification model using a query transformer and/or random forest classifier, which may be similar or identical to the query transformer 212*b*, and random forest classifier 212*c* of the stored procedures 212.

In some embodiments, the query classifier module 222*a* operates in a manner similar to the example procedure described above with respect to the model training module 212*a*, query transformer 212*b*, and random forest classifier 212*c*. For example, a query prediction process may comprise: receiving a data query (e.g., from a user device through a web-based interface); cleaning up and transforming the submitted data query (e.g., converting dates to generic text strings in a format consistent with the query classification model, removing comments, and/or removing tabs, new line characters, and predetermined stop words), to generate a transformed data query output; fragmenting the transformed data query into one or more query features in association with their respective elements; and putting the query features through an extraction pipeline to generate feature count vectors and an assembled vector. The feature-based vectors for the submitted data query are input to a random forest classifier (e.g., random forest classifier 212*c*) to identify a best-fit vector in the query classification model data 216*b* and determine the performance data and/or cost data associated with the identified (historical) vector. Finally, the determined performance and/or cost data may be output (e.g., to a user who submitted the data query for evaluation and/or to query prediction data 226*a* for storage).

According to some embodiments, the determined performance data and/or cost data may be used by query recommendation module 222*b* to identify one or more corresponding entries in query recommendation data 226*b*. Query recommendation data 226*b* may include recommendation information about suggested changes to and/or deletions of any one or more of the identified features in the submitted data query. Recommendation data may be output, according to some embodiments, to query data source 230 (e.g., for output to a user).

Figure 3:
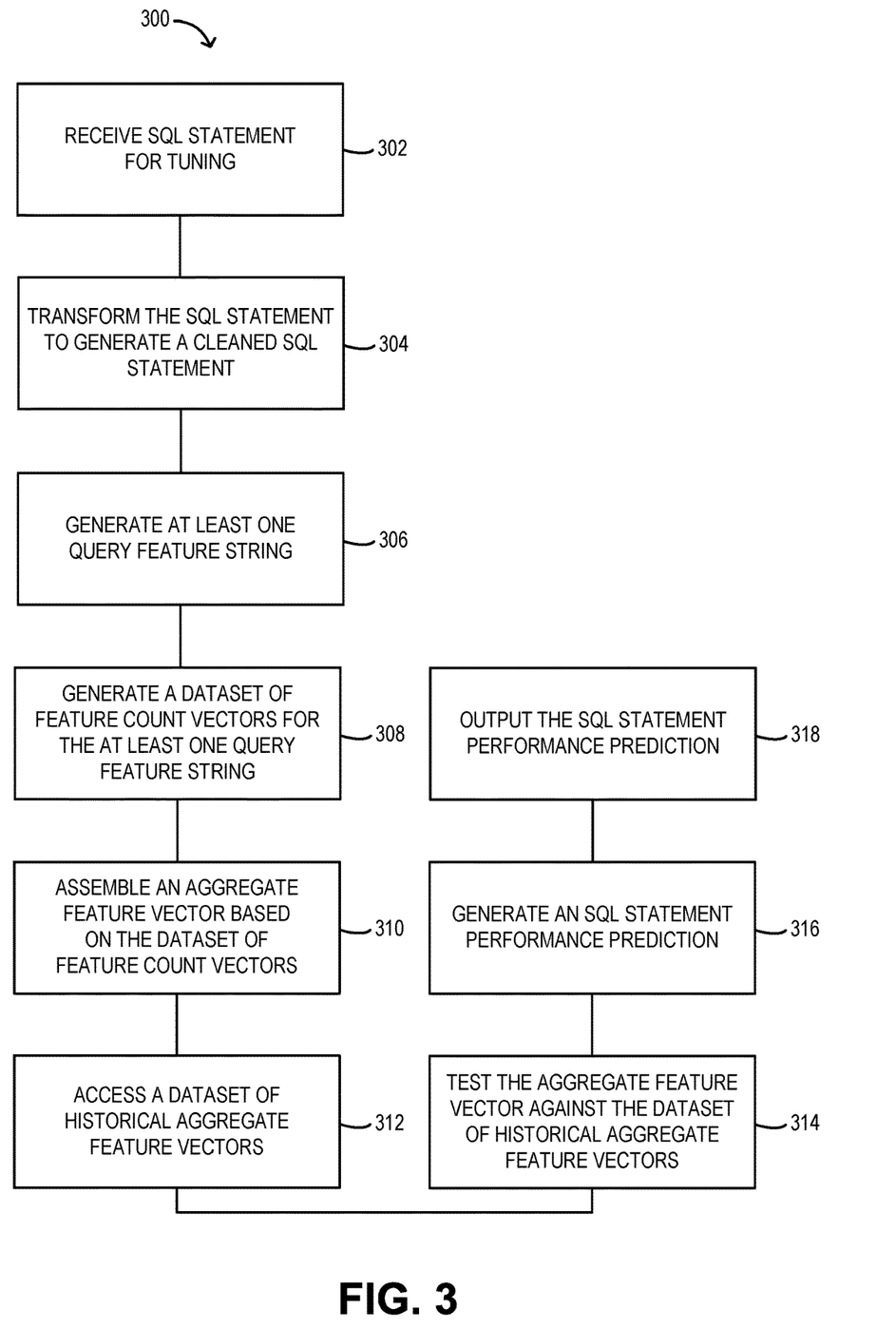
FIG. 3 is a flowchart of a method according to one or more embodiments.

Referring now to FIG. 3, a flow diagram of a method 300 according to some embodiments is shown. The method 300 may be performed, for example, by a query optimization controller, query classification engine, and/or query prediction system. According to some embodiments, the method 300 may comprise receiving an SQL statement for tuning, at 302 (e.g., from a user via a connected network device). The method 300 may further comprise transforming the SQL statement to generate a cleaned SQL statement, at 304. The method 300 may further comprise generating at least one query feature string, at 306, and generating a dataset of feature count vectors for the at least one query feature string, at 308. The method 300 may further comprise assembling an aggregate feature vector based on the dataset of feature count vectors, at 310.

In accordance with some embodiments, the method 300 may further comprise accessing a dataset of historical aggregate feature vectors (e.g., query classification model data 216*b*), at 312, and testing the aggregate feature vector against the dataset of historical aggregate feature vectors (e.g., using a random forest classifier), at 314. An SQL statement performance prediction (e.g. "low", "FAIL") may be generated (e.g., based on the testing at 314), at 316, and output, at 318 (e.g., to a user who submitted the SQL statement for evaluation).

Figure 4:
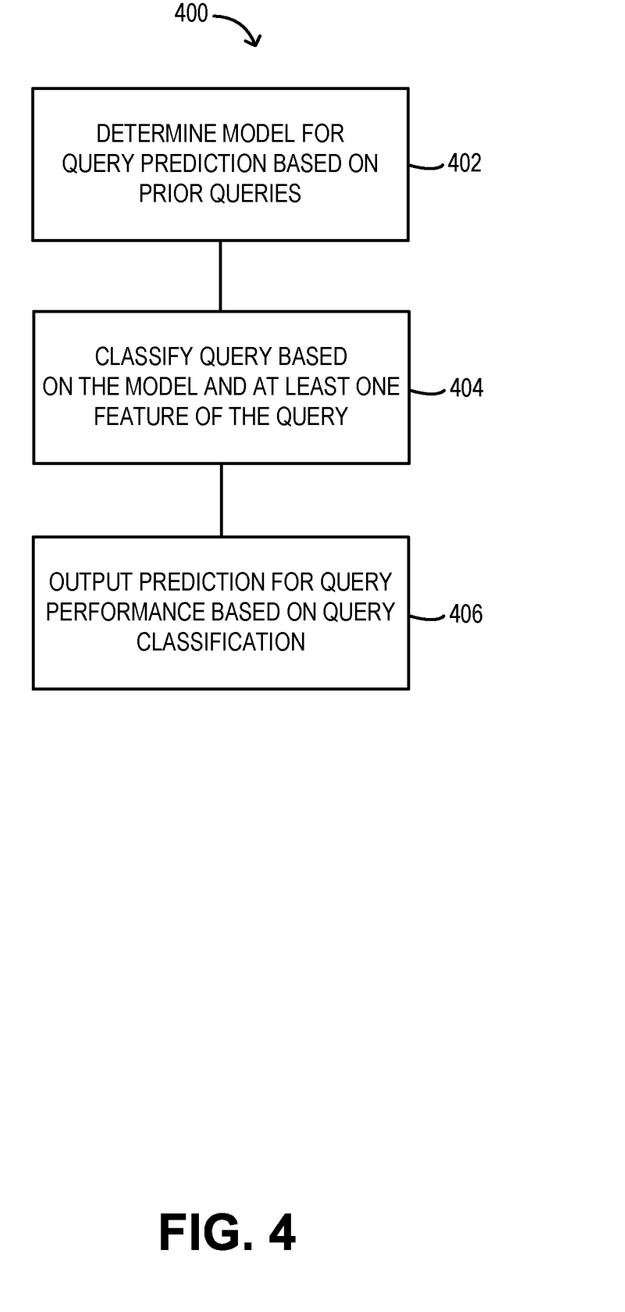
FIG. 4 is a flowchart of a method according to one or more embodiments.

Referring now to FIG. 4, a flow diagram of a method 400 according to some embodiments is shown. The method 400 may be performed, for example, by a query optimization system, model training system, and/or query prediction system. According to some embodiments, the method 400 may comprise determining a model for query prediction based on prior queries (e.g. using a model training module 212*a*, query transformer 212*b*, and/or random forest classifier), at 402. The method 400 may further comprise classifying a query based on the determined model and at least one feature of the query (e.g., using query classifier module 222*a*), at 404, and outputting the prediction for query performance based on the query classification, at 406.

Figure 5:
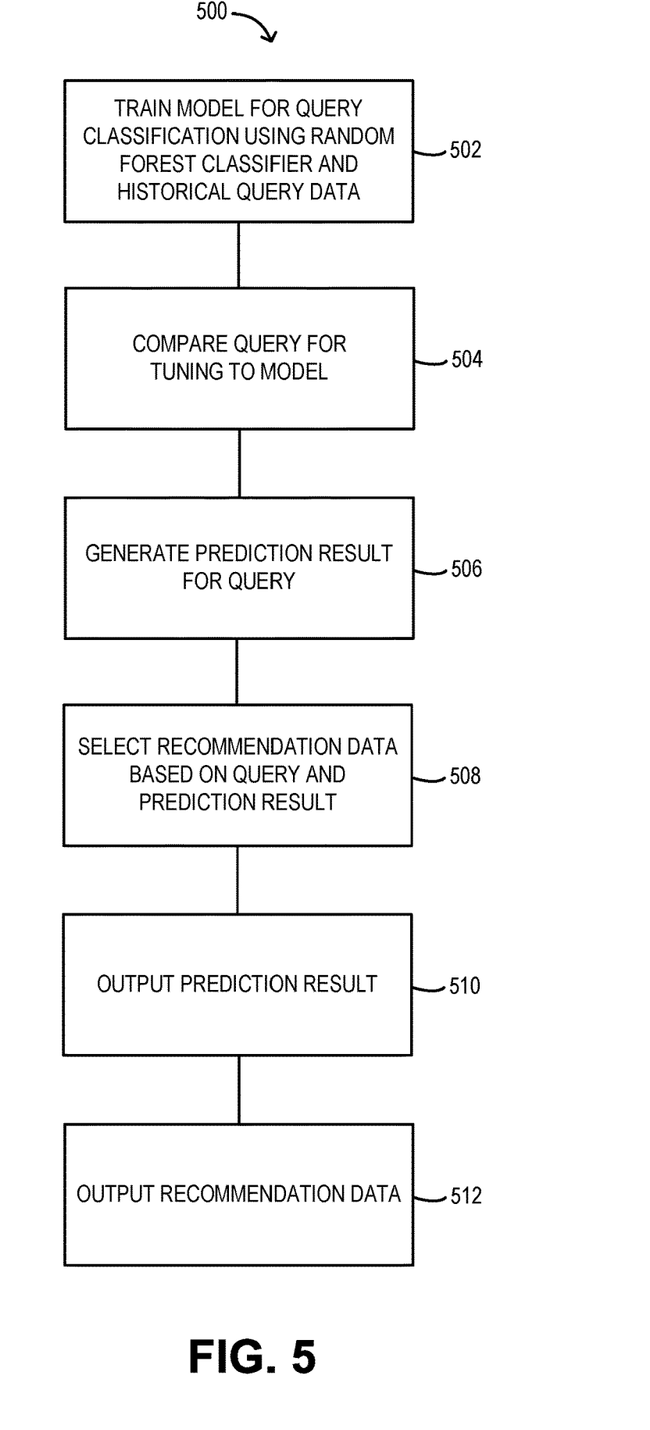
FIG. 5 is a flowchart of a method according to one or more embodiments.

Referring now to FIG. 5, a flow diagram of a method 500 according to some embodiments is shown. The method 500 may be performed, for example, by a query optimization system, model training system, query recommendation system, and/or query prediction system. According to some embodiments, the method 500 may comprise training a model for query classification using a random forest classifier and historical query data (e.g., in accordance with one or more stored procedures 212), at 502. The method 500 may further comprise comparing a query for tuning to the model, at 504; and generating a prediction result for the query, at 506. The method 500, in accordance with some embodiments, may further comprise selecting recommendation data (e.g., from query recommendation data 226*b*) based on the query and the prediction result, at 508. Finally, the method 500 may comprise outputting the prediction result for the query, at 510, and outputting the recommendation data, at 512.

Figure 6:
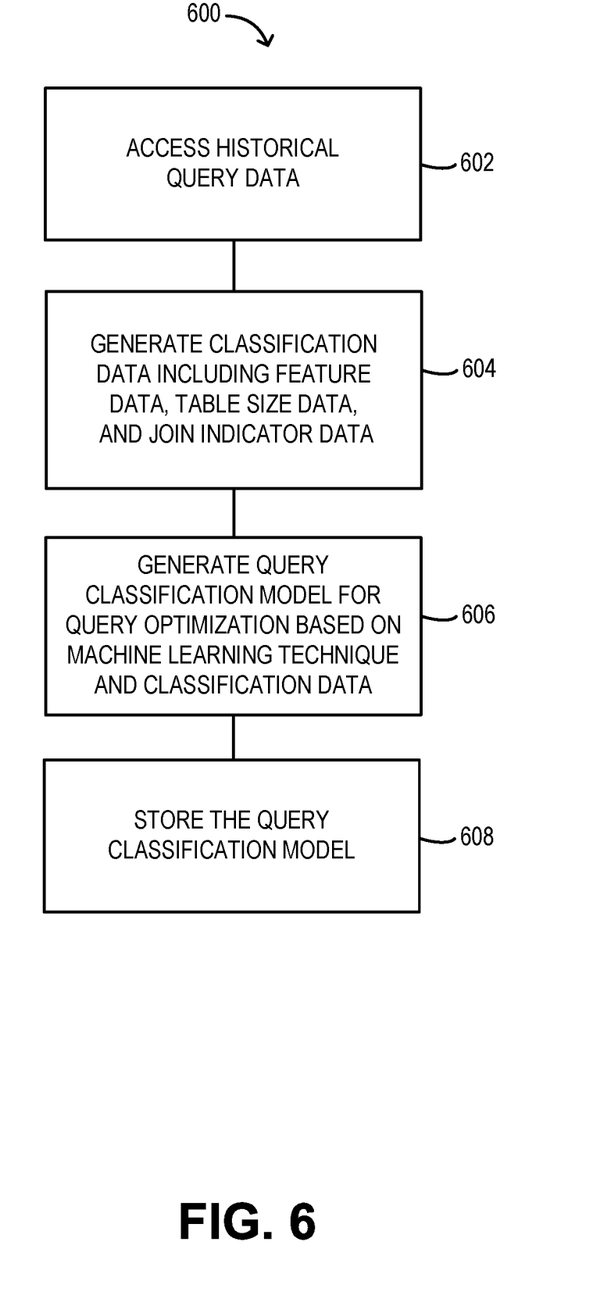
FIG. 6 is a flowchart of a method according to one or more embodiments.

Referring now to FIG. 6, a flow diagram of a method 600 according to some embodiments is shown. The method 600 may be performed, for example, by a query optimization system and/or model training system. According to some embodiments, the method 600 may comprise accessing historical query data, at 602, and generating classification data including feature data, table size data, and/or join indicator data (e.g., for each query of the historical query data), at 604. The method 600 may further comprise generating a query classification model for query optimization based on at least one machine learning technique (e.g., a random forest classifier) and the generated classification data, at 606, and storing the query classification model (e.g., in data table 216*b*), at 608.

Figure 7:
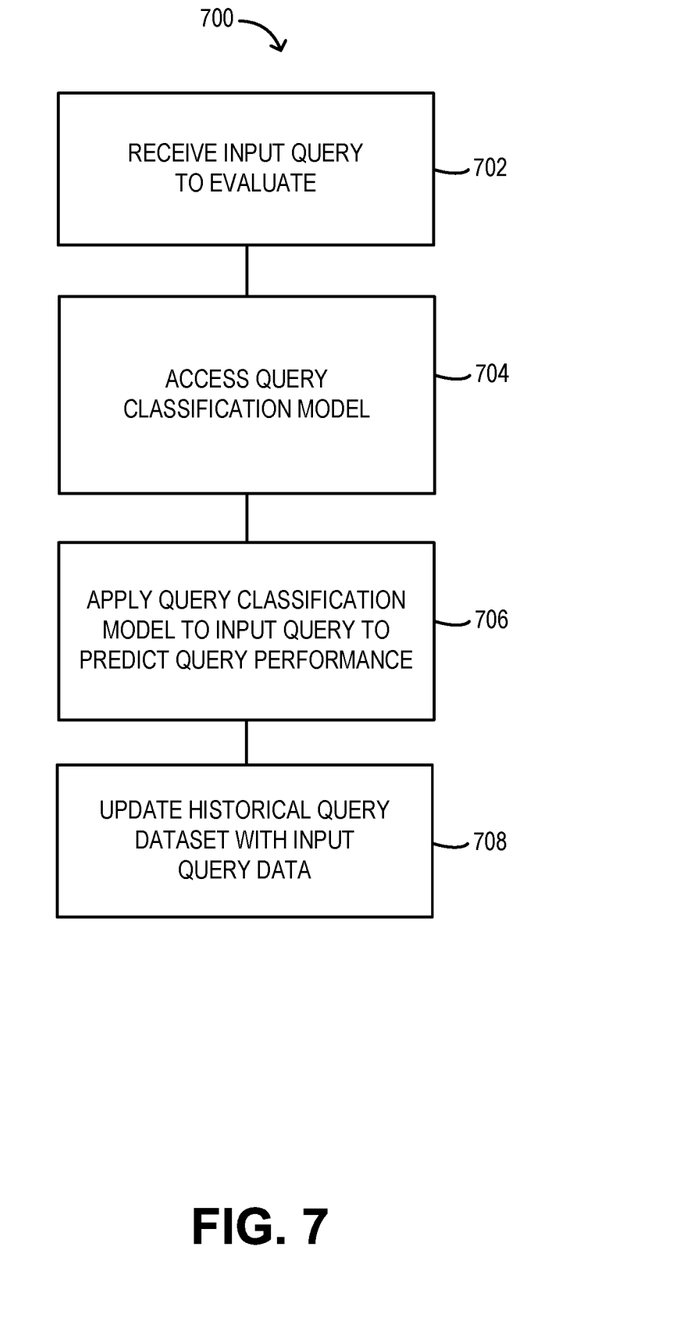
FIG. 7 is a flowchart of a method according to one or more embodiments.

Referring now to FIG. 7, a flow diagram of a method 700 according to some embodiments is shown. The method 700 may be performed, for example, by a query optimization system and/or query prediction system. According to some embodiments, the method 700 may comprise receiving an input query to evaluate (e.g., from query data source 230), at 702, and accessing a query classification model (e.g., by retrieving query classification model data 216*b*), at 704. The method 700 may comprise applying the query classification model to the input query to predict query performance for the input query, at 706. In accordance with some embodiments, the method 700 may further comprise updating an historical query dataset (e.g., historical query data 216*a*) with the input query data (e.g., for additional training of the query classification model), at 708.

According to some embodiments, one or more computer processing apparatus may execute, process, facilitate, and/or otherwise be associated with one or more methods (e.g., predictive evaluations of data queries and/or query classification model training) described in this disclosure. The apparatus may be suitable, for example, for providing functionality of any of the query optimization controller 104, query classification engine 110, recommendation engine 112, model training system 210, and/or query prediction system 220, and/or may otherwise comprise a portion of the systems 100 and 200 described in this disclosure.

In some embodiments, the apparatus may comprise at least one processing device, input device, output device, communication device, and/or memory device. Fewer or more components and/or various configurations of the components may be included in the apparatus without deviating from the scope of embodiments described in this disclosure.

According to some embodiments, the processing device may be or include any type, quantity, and/or configuration of electronic and/or computerized processor that is or becomes known. The processing device may comprise, for example, an Intel® IXP 2800 network processor or an Intel® XEON™ Processor coupled with an Intel® E7501 chipset. In some embodiments, the processing device may comprise multiple inter-connected processors, microprocessors, and/or micro-engines. According to some embodiments, the processing device (and/or the apparatus and/or portions thereof) may be supplied power via a power supply such as a battery, an alternating current (AC) source, a direct current (DC) source, an AC/DC adapter, solar cells, and/or an inertial generator. In the case that the apparatus comprises a server such as a blade server, necessary power may be supplied via a standard AC outlet, power strip, surge protector, and/or uninterruptible power supply (UPS) device.

In some embodiments, the input device and/or the output device are communicatively coupled to the processing device (e.g., via wired and/or wireless connections and/or pathways) and they may comprise any types or configurations of input and output components and/or devices that are or become known, respectively. The input device may comprise, for example, a keyboard that allows an operator of the apparatus to interface with the apparatus (e.g., by a developer, such as to initiate an SQL statement evaluation process). The output device may, according to some embodiments, comprise a display screen and/or other practicable output component and/or device. The output device may, for example, provide an SQL evaluation interface to a developer (e.g., for inputting SQL query data). According to some embodiments, the input device and/or the output device may comprise and/or be embodied in a single device, such as a touch-screen monitor.

In some embodiments, the communication device may comprise any type or configuration of communication device that is or becomes known or practicable. The communication device may, for example, comprise a network interface card (NIC), a telephonic device, a cellular network device, a router, a hub, a modem, and/or a communications port or cable. In some embodiments, the communication device may be coupled to provide data to a developer device and/or a user device, such as in the case that the apparatus is configured to provide a data query evaluation process with predetermined model training and/or query performance parameters as described this disclosure. In some embodiments, the communication device may comprise an IR, RF, Bluetooth™, and/or Wi-Fi® network device coupled to facilitate communications between the processing device and another device (such as a developer device and/or a user device).

According to the example embodiment for an apparatus, the memory device may comprise any appropriate information storage device that is or becomes known or available, including, but not limited to, units and/or combinations of magnetic storage devices (e.g., a hard disk drive), optical storage devices, and/or semiconductor memory devices such as RAM devices, read only memory (ROM) devices, single data rate random access memory (SDR-RAM), double data rate random access memory (DDR-RAM), and/or programmable read only memory (PROM).

The memory device may, according to some embodiments, store one or more of model training instructions, recommendation instructions, and/or query prediction instructions. In some embodiments, software instructions and/or data stored in the memory device may be utilized by the processing device to provide output information via the output device and/or the communication device.

Any or all of the specialized instructions and data types described this disclosure and other practicable types of data may be stored in any number, type, and/or configuration of memory devices that is or becomes known. The memory device may, for example, comprise one or more data tables or files, databases, table spaces, registers, and/or other storage structures. In some embodiments, multiple databases and/or storage structures (and/or multiple memory devices) may be utilized to store information associated with the apparatus. According to some embodiments, the memory device may be incorporated into and/or otherwise coupled to the apparatus (e.g., as shown) or may simply be accessible to the apparatus (e.g., externally located and/or situated).

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may store program instructions, software, and/or modules that, when executed by a processing device, cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB key fob, dongle, and/or other type of flash memory data storage device that is or becomes known or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols. For a more exhaustive list of protocols, the term "network" is defined in this disclosure and includes many exemplary protocols that are also applicable in this disclosure.

In some embodiments, one or more specialized machines such as a computerized processing device, a server, a remote terminal, and/or a user device may implement the various practices described in this disclosure.

Numerous embodiments are described in this disclosure and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The terms "an embodiment," "embodiment," "embodiments," "the embodiment," "the embodiments," "one or more embodiments," "some embodiments," "one embodiment" and the like mean "one or more (but not all) disclosed embodiments," unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "in this disclosure" means "in the present disclosure, including anything which may be incorporated by reference," unless expressly specified otherwise.

The phrase "at least one of," when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car, and a wheel.

The phrase "based on" does not mean "based only on," unless expressly specified otherwise. In other words, the phrase "based on" describes both "based only on" and "based at least on."

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, organic LED (OLED), CRT, digital light processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p, 4k, or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch-screen features or associated keypads as is well understood.

The present disclosure may refer to a "control system." A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium).

As used in this disclosure, the term "network component" may refer to a user or network device, or a component, piece, portion, or combination of user or network devices. Examples of network components may include a static random-access memory (SRAM) device or module, a network processor, and a network communication path, connection, port, or cable.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication." As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a software, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

It will be readily apparent that the various methods and algorithms described in this disclosure may be implemented by, e.g., specially programmed computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input, and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A controller device for query prediction, comprising:
a processor; and
a computer-readable medium storing instructions that when executed by the processor direct the processor to:
receive, from a user query device, a structured query language (SQL) statement for tuning;
automatically transform the SQL statement to generate a cleaned SQL statement, wherein the transforming comprises at least one of (i) identifying and converting any date within the SQL statement to a standardized format and (ii) identifying and removing at least one word from the SQL statement;
automatically generate at least one query feature string based on the cleaned SQL statement, each query feature string corresponding to a respective SQL feature of the cleaned SQL statement;
automatically generate, for each query feature string, a respective feature count vector comprising an indication of the corresponding SQL feature and an indication of a number of occurrences of the corresponding SQL feature in the cleaned SQL statement, thereby generating a dataset of feature count vectors;
automatically assemble, based on the dataset of feature count vectors, an aggregate feature vector;
access a dataset of historical aggregate feature vectors;
automatically generate an SQL statement performance prediction for the SQL statement by testing the aggregate feature vector against the dataset of historical aggregate feature vectors,
wherein generating the SQL statement performance prediction for the SQL statement does not comprise executing the SQL statement; and
output the SQL statement performance prediction.

2. The controller device of claim 1, wherein the instructions when executed by the processor further direct the processor to:
automatically select, from a plurality of SQL tuning recommendations, at least one SQL tuning recommendation for the SQL statement, based on the SQL statement performance prediction.

3. The controller device of claim 1, wherein the instructions when executed by the processor further direct the processor to:
automatically modify the SQL statement based on the SQL statement performance prediction.

4. The controller device of claim 1, wherein the SQL statement performance prediction comprises an alphanumeric identifier.

5. The controller device of claim 1, wherein the SQL statement performance prediction comprises a numeric value.

6. The controller device of claim 1, wherein the SQL statement performance prediction indicates the SQL statement should not be executed.

7. The controller device of claim 1, wherein the SQL statement performance prediction indicates the SQL statement should be executed.

8. The controller device of claim 1, wherein each feature count vector comprises an indication of a respective query feature and an indication of a number of that SQL query feature in the SQL statement.

9. The controller device of claim 1, wherein each feature count vector is formatted as an index.

10. The controller device of claim 1, wherein the aggregate feature vector comprises a total count of all SQL features in the cleaned SQL statement.

11. The controller device of claim 1, wherein generating the SQL statement performance prediction for the SQL statement comprises:
generating the SQL statement performance prediction using a classifier based on one or more of:
a random forest algorithm,
a logistic regression algorithm,
a neural network algorithm,
a naïve Bayes algorithm,
a support vector machine algorithm,
a gradient boosting algorithm, and
a boosted trees algorithm.

12. The controller device of claim 1, wherein generating the SQL statement performance prediction for the SQL statement comprises:
generating the SQL statement performance prediction using a machine learning classifier.

13. The controller device of claim 1, wherein the instructions when executed by the processor further direct the processor to:

add the aggregate feature vector to the dataset of historical aggregate feature vectors.

14. The controller device of claim 1, wherein the instructions when executed by the processor further direct the processor to:
generate the dataset of historical aggregate feature vectors based on a plurality of previously-executed SQL statements.

15. A computer-implemented method for query prediction, comprising:
receiving, from a user query device, a structured query language (SQL) statement for tuning;
automatically transforming the SQL statement to generate a cleaned SQL statement, wherein the transforming comprises at least one of (i) identifying and converting any date within the SQL statement to a standardized format and (ii) identifying and removing at least one word from the SQL statement;
automatically generating at least one query feature string based on the cleaned SQL statement, each query feature string corresponding to a respective SQL feature of the cleaned SQL statement;
automatically generating, for each query feature string, a respective feature count vector comprising an indication of the corresponding SQL feature and an indication of a number of occurrences of the corresponding SQL feature in the cleaned SQL statement, thereby generating a dataset of feature count vectors;
automatically assembling, based on the dataset of feature count vectors, an aggregate feature vector;
accessing a dataset of historical aggregate feature vectors;
automatically generating an SQL statement performance prediction for the SQL statement by testing the aggregate feature vector against the dataset of historical aggregate feature vectors, wherein generating the SQL statement performance prediction for the SQL statement does not comprise executing the SQL statement; and
outputting the SQL statement performance prediction.

16. The computer-implemented method of claim 15, further comprising:
automatically selecting, from a plurality of SQL tuning recommendations, at least one SQL tuning recommendation for the SQL statement, based on the SQL statement performance prediction.

17. The computer-implemented method of claim 15, further comprising:
automatically modifying the SQL statement based on the SQL statement performance prediction.

18. The computer-implemented method of claim 15, wherein the SQL statement performance prediction comprises at least one of an alphanumeric identifier and a numeric value.

19. The computer-implemented method of claim 15, wherein the SQL statement performance prediction indicates the SQL statement should not be executed.

20. The computer-implemented method of claim 15, wherein the SQL statement performance prediction indicates the SQL statement should be executed.

21. The computer-implemented method of claim 15, wherein each feature count vector comprises an indication of a respective query feature and an indication of a number of that SQL query feature in the SQL statement.

22. The computer-implemented method of claim 15, wherein each feature count vector is formatted as an index.

23. The computer-implemented method of claim 15, wherein the aggregate feature vector comprises a total count of all SQL features in the cleaned SQL statement.

24. The computer-implemented method of claim 15, wherein generating the SQL statement performance prediction for the SQL statement comprises:
generating the SQL statement performance prediction using a machine learning classifier based on one or more of:
a random forest algorithm,
a logistic regression algorithm,
a neural network algorithm,
a naïve Bayes algorithm,
a support vector machine algorithm,
a gradient boosting algorithm, and
a boosted trees algorithm.

25. The computer-implemented method of claim 15, further comprising:
adding the aggregate feature vector to the dataset of historical aggregate feature vectors.

26. The computer-implemented method of claim 15, further comprising:
generating the dataset of historical aggregate feature vectors based on a plurality of previously-executed SQL statements.

* * * * *